United States Patent
Keller et al.

(10) Patent No.: US 10,057,744 B2
(45) Date of Patent: Aug. 21, 2018

(54) INFORMATION EXCHANGE FOR HAND-HELD ELECTRONIC DEVICES

(71) Applicant: THOMSON LICENSING, Issy de Moulineaux (FR)

(72) Inventors: Anton Werner Keller, Ami (CH); Magdy Megeid, Zurich (CH)

(73) Assignee: THOMAS LICENSING, Issy les Moulineaux (FR)

( * ) Notice: Subject to any disclaimer, the term of this patent is extended or adjusted under 35 U.S.C. 154(b) by 0 days.

(21) Appl. No.: 15/313,188

(22) PCT Filed: Jun. 4, 2014

(86) PCT No.: PCT/IB2014/000965
§ 371 (c)(1),
(2) Date: Nov. 22, 2016

(87) PCT Pub. No.: WO2015/185954
PCT Pub. Date: Dec. 10, 2015

(65) Prior Publication Data
US 2017/0156022 A1    Jun. 1, 2017

(51) Int. Cl.
*H04B 5/00* (2006.01)
*H04W 4/80* (2018.01)
*H04W 4/00* (2018.01)

(52) U.S. Cl.
CPC .......... *H04W 4/80* (2018.02); *H04B 5/0031* (2013.01); *H04W 4/008* (2013.01)

(58) Field of Classification Search
USPC ...... 455/41.1–41.3, 550.1, 575.1, 575.7, 448
See application file for complete search history.

(56) References Cited

U.S. PATENT DOCUMENTS

| | | | |
|---|---|---|---|
| 7,925,289 | B2 | 4/2011 | David |
| 2005/0164634 | A1* | 7/2005 | Tanaka ............... H04L 63/0492 455/41.2 |
| 2009/0298419 | A1 | 12/2009 | Ahya et al. |
| 2010/0005520 | A1 | 1/2010 | Abbot et al. |
| 2010/0144328 | A1 | 6/2010 | Keating et al. |

(Continued)

FOREIGN PATENT DOCUMENTS

| | | |
|---|---|---|
| CN | 102239679 | 11/2011 |
| DE | 102011085537 | 5/2013 |
| EP | 2665197 | 11/2013 |

OTHER PUBLICATIONS

Yu et al., "Context-aware Community: Integrating contexts with contacts for proximity-based mobile social networking," Proc. of 2013 IEEE 9th Int'l. Conference on Distributed Computing in Sensor Systems (DCoSS 2013), 10 pages.

(Continued)

*Primary Examiner* — Fayyaz Alam
(74) *Attorney, Agent, or Firm* — Brian J Dorini; Patricia A. Verlangieri (57) ABSTRACT

A method for a first electronic device having first and second antennas for communicating with a second device is disclosed. The method comprises determining which one of the first and second antennas of the first device is stimulated by an electromagnetic field generated by the second device; and transmitting one of first and second types of information according to which one of the first and second antennas is the determined antenna.

15 Claims, 6 Drawing Sheets

(56) References Cited

U.S. PATENT DOCUMENTS

| | | | |
|---|---|---|---|
| 2011/0022755 A1* | 1/2011 | Sueyoshi | H04B 5/0031 |
| | | | 710/109 |
| 2011/0151890 A1 | 6/2011 | Platt et al. | |
| 2013/0072115 A1* | 3/2013 | Dobyns | H04B 5/0081 |
| | | | 455/41.1 |
| 2013/0309964 A1* | 11/2013 | Hall | H04B 5/00 |
| | | | 455/41.1 |

OTHER PUBLICATIONS

James, "Color: A new photo sharing proximity-based social network app," Mobile, http://www.geek.com/mobile/color-a-new-photo-sharing-proximity-based . . . , 3 pages, Mar. 24, 2011.

Rao, "LoKast's Proximity Based Mobile App Takes Content Sharing to a new Level," http://techcrunch.com . . . , 4 pages.

* cited by examiner

FIG. 1

(Prior Art)

INFORMATION EXCHANGE FOR HAND-HELD ELECTRONIC DEVICES

This application claims the benefit, under 35 U.S.C. § 365 of International Application PCT/IB2014/000965, filed Jun. 4, 2014, which was published in accordance with PCT Article 21(2) on Dec. 10, 2015 in English.

BACKGROUND OF THE INVENTION

Field of the Invention

The present invention generally relates to exchanging information between hand-held electronic devices, such as electronic business cards, mobile telephone devices, touch tablets, personal computers (PC), remote control devices, and/or other devices, and more particularly, to sending different type of information from a first electronic device to a second electronic device according to which one of at least two antennas in the first electronic device is stimulated by the second electronic device.

Background Information

Many hand-held electronic devices, such as electronic business cards, mobile telephone devices, touch tablets, personal computers (PC), and/or other devices may implement near field communication (NFC) technology, so that when two such devices come in contact or in close proximity, usually no more than a few inches, to each other, can exchange information, such as business card information.

Figure 1:
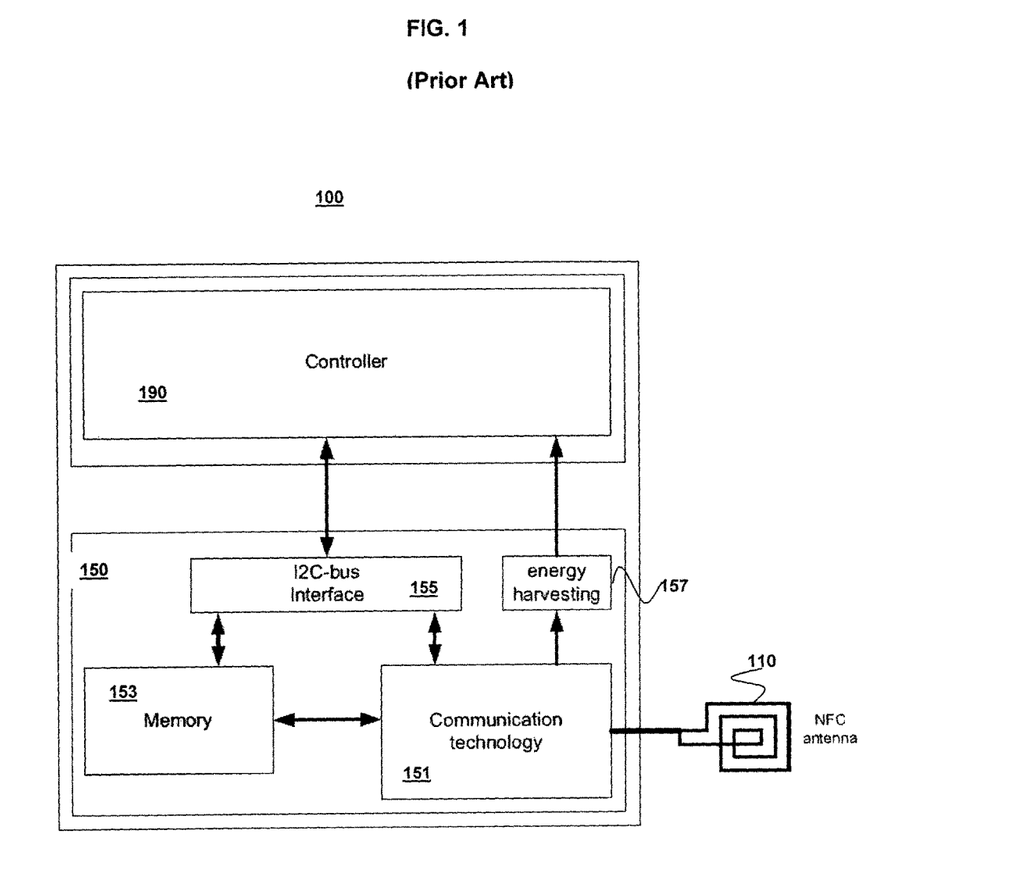
FIG. 1 shows a conventional implementation of a NFC device 100.

FIG. 1 illustrates a conventional implementation of a NFC device 100 for exchanging information with another NFC device. For simplicity, the NFC device 100 is called a friendship token 100 because it enables exchanging business card information with a friend. The friendship token 100 includes a NFC antenna 110 for transmitting/receiving signals to/from another friendship token, a NFC controller 150, which may be embodied in an integrated circuit (IC) for transmitting/receiving NFC signals from the antenna 110 and a micro controller 190 for overall control of the friendship token 100. The NFC controller 150 implements NFC protocols, data formats and functionalities according to NFC standards, which are based on existing radio-frequency identification (RFID) standards (including ISO/IEC 14443 and FeliCa). NFC allows a short range communication (about 10 cm or 4 inches) with relative low transfer rate (106 kb/s). The NFC controller 150 includes a driver/receiver (communication technology) 151 for transmitting/receiving NFC signals from the antenna 110, a memory 153 for storing data such as business card information, a bus interface (e.g., an IIC bus interface) 155 communicating with the micro controller 190, and an energy harvesting block 157 for collecting power from the radio frequency (RF) field generated by another NFC device via the antenna 110 and supplying power to operate the micro controller 190. The NFC controller 150 is also powered by power generated by the RF field.

One problem associated with a conventional friendship token is that it is limited to paying fees as a credit card or transferring business card information as an electronic business card (e.g., vCard). Accordingly, there is a need in the art to address the foregoing limitations, and thereby provide more functionalities and security features for a friendship token.

SUMMARY OF THE INVENTION

In accordance with an aspect of the present invention, a method for a first device having first and second antennas for communicating with a second device is disclosed. The method comprises determining which one of the first and second antennas of the first device is stimulated by an electromagnetic field generated by the second device; and transmitting one of first and second types of information according to which one of the first and second antennas is the determined antenna.

In one embodiment, the electromagnetic field is a non-radiactive field.

In another embodiment, if the first antenna is the determined antenna, the first type of information is transmitted and if the second antenna is the determined antenna, the second type of information is transmitted.

In another embodiment, the first device further includes a third antenna, the determining step determines which one of the first, second, and third antennas is stimulated and if the third antenna is stimulated, the transmitting step transmits a fourth type of information different from the first and second types of information.

In another embodiment, the method further comprises determining if a security element is enabled before transmitting the first or second type of information; and if the security element is not activated, transmitting a third type of information without transmitting the first or second type of information.

In another embodiment, the method further comprises receiving a signal from the second device, the signal including an identification of the second device; determining if the identification of the second device exists in a database before transmitting the first or second type of information; and if the identification does not exist in the database, terminating communication with the second device or transmitting a third type of information without transmitting the first or second type of information.

In another embodiment, the method further comprises further comprising receiving a name and a password from the second device; if the name and password exist in a database, transferring data stored in the data base relating to the received user name; and if the name and password do not exist in the database, transmitting a third type of information.

In another embodiment, the first type of information includes business card and private card information, the second type of information includes business card but no private card information, and third type information a name stored in the first device.

In another embodiment, the first, second, and third types of information are predefined by a user and stored in a memory of the first device.

In another embodiment, the first device has first and second faces and the first and second antennas are placed respectively at the first and second faces with a first electromagnetic shield placed between the first and second antennas. The first device may include a third antenna placed in the second face along with the second antenna and a second electromagnetic shield is placed between the second and third antennas. The method may further comprises detecting that the second antenna is stimulated a predetermined time after the determined antenna is detected; detecting that the third antenna is stimulated; and transmitting a fourth type of information different from the first and second types of information.

In accordance with an aspect of the present invention, a first electronic device is disclosed. The first electronic device comprises a first antenna; a second antenna; and a microprocessor: wherein the microprocessor is configured to determine which one of the first and second antennas is stimulated by an electromagnetic field generated by a second electronic device; and transmit one of first and second types of information according to which one of the first and second antennas is the determined antenna.

In one embodiment, the electromagnetic field is a non-radiactive field.

In another embodiment, if the first antenna is the determined antenna, the microprocessor is configured to transmit the first type of information and if the second antenna is the determined antenna, the microprocessor is configured to transmit the second type of information.

In another embodiment, the first electronic device comprises a third antenna and the microprocessor being configured to determine which one of the first, second, and third antennas is stimulated and if the third antenna is stimulated, the microprocessor is configured to transmit a fourth type of information different from the first and second types of information.

In another embodiment, the microprocessor is configured to determine if a security element is enabled before transmitting the first or second type of information; and if the security element is not activated, the microprocessor is configured to transmit a third type of information without transmitting the first or second type of information.

In another embodiment, the microprocessor is configured to receive a signal from the second electronic device, the signal including an identification of the second electronic device; determine if the identification of the second electronic device exists in a database before transmitting the first or second type of information; and if the identification does not exist in the database, terminate communication with the second electronic device or transmit a third type of information without transmitting the first or second type of information.

In another embodiment, the microprocessor is configured to receive a name and a password from the second device; if the name and password exist in a database, transfer data stored in the data base relating to the received user name; and if the name and password do not exist in the database, transmit a third type of information.

In another embodiment, the first type of information includes business card and private card information, the second type of information includes business card but no private card information, and third type information a name stored in the first device.

In another embodiment, the first, second, and third types of information are predefined by a user and stored in a memory of the first device.

In another embodiment, the first electronic device further comprises first and second faces and the first and second antennas are placed respectively at the first and second faces with a first electromagnetic shield placed between the first and second antennas.

In another embodiment, the first electronic device further comprises a third antenna placed in the second face along with the second antenna and a second electromagnetic shield is placed between the second and third antennas.

In another embodiment, if the microprocessor detects that the second antenna is stimulated a predetermined time after the determined antenna is detected and that the third antenna is stimulated afterward; the microprocessor is configured to transmit a fourth type of information different from the first and second types of information.

The aforementioned brief summary of exemplary embodiments of the present invention is merely illustrative of the inventive concepts presented herein, and is not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner. For clarity of description, the same reference numbers may be used throughout the following description to represent the same or similar elements of the drawing figures.

DESCRIPTION OF THE PREFERRED EMBODIMENTS

Figure 2:
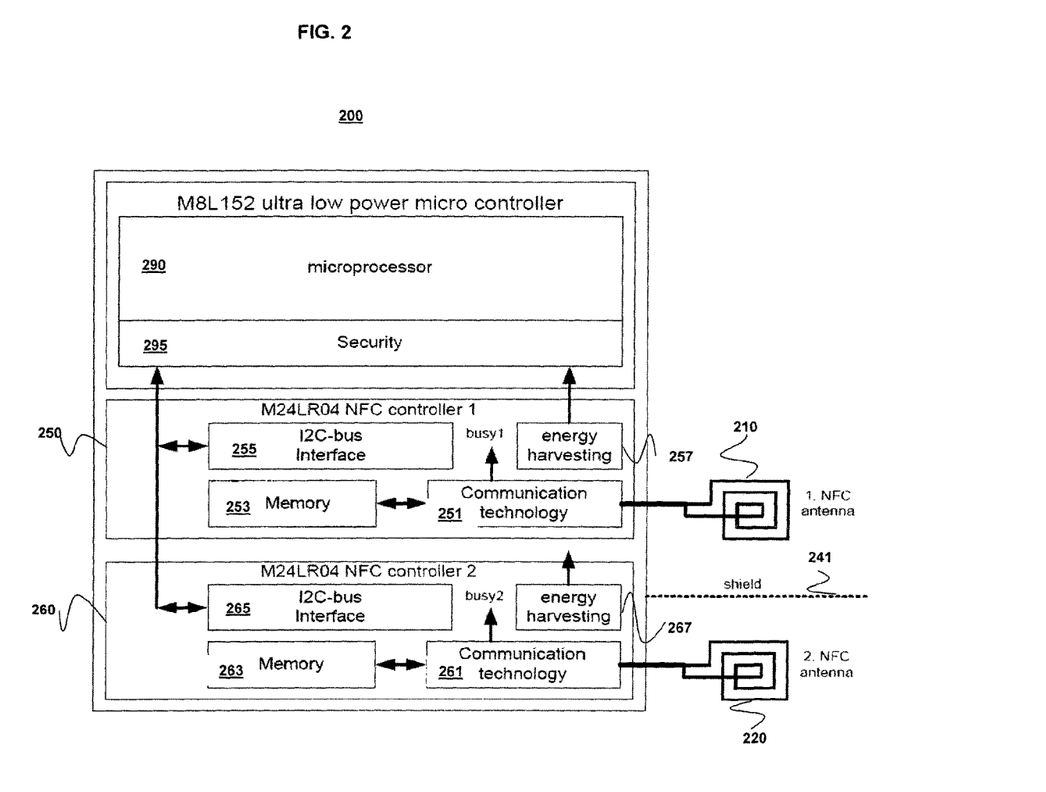
FIG. 2 shows a block diagram of an exemplary friendship token 200 according to an exemplary embodiment of the present invention.

Referring now to the drawings, and more particularly to FIG. 2, a block diagram showing relevant portions of a friendship token 200 suitable for implementing exemplary embodiments of the present invention is illustrated. According to an exemplary embodiment, the friendship token 200 is embodied as a credit card. However, the friendship token 200 can be part of a hand-held device (e.g., mobile telephone device, touch tablet, portable personal computer (PC), slate, remote control device, etc. and/or other type of handheld device).

As indicated in FIG. 2, the friendship token 200 comprises a first NFC (Near Field Communication) controller 250 and the associated antenna 210, a second NFC controller 260 and the associated antenna 220, and a microprocessor 290, which may implement the security element 295.

The first and second NFC controllers 250 and 260 can be implemented using, for example, a M24LR04 series chip, manufactured by STMicroelectronics, Geneva, Switzerland. The functions of components 210/220, 251/261, 253/263, 255/265, 257/267 of the NFC controller 250/260 are respectively similar to components 110, 151, 153, 155, and 157 in the friendship token 100 shown in FIG. 1 and will not be repeated here.

According to the principles of the embodiments of the invention, the first NFC antenna 210 and the second NFC antenna 220 are arranged such that they are not stimulated simultaneously by the radio frequency (RF) field generated by another NFC device. This can be done, for example, by arranging them apart from each other, shielding them using, for example, shield 241, or arranging them in orthogonal positions. In the present example, the friendship token 200 is a credit card and the two antennas can be arranged at two different faces of the credit card with an electromagnetically shielding placed in between.

Each NFC controller has a memory, which may include an electrically programmable read only memory (EPROM) and random access memory (RAM). In this example, the EPROM in the memory 253 of the NFC controller 250 may store the NFC identification of the NFC controller 250 and a first type of information such as private card information, and the EPROM in the memory 263 of the NFC controller 260 may store the NFC identification of the NFC controller 260 and a second type of information, such as business card information. In addition to the first type of information, the EPROM of the NFC controller 250 may also store the second type of information. Business card information normally includes name of the company, company web site address, a name of the owner of the friendship token 200, job title, photo of the owner, business address, business phone numbers, business email address and/or possible other business information such as logo, and advertisements. Business card information should not include private information, such as private email address, home address, home phone numbers, hobbies, and other non-business information, but does not need to include all the business related information listed above. Private card information includes private information but may also include business card information. Private card information does not need to include all the private information listed above.

Both memories 253 and 263 may store a third type or more different types of information. In this example, the third type of information is basic personal information of the owner, e.g., name of the owner. The third type of information may simply inform the communicating NFC device that no information can be provided for a specific reason. The first, second, and third types of information may be preprogrammed by a user via the microprocessor 290. The microprocessor 290 may also store a copy of the first, second, and third types of information in its internal (built-in) memory (not shown).

The first type of information should include some information not disclosed in the second type of information, and both first and second types of information should include more information than the third type of information.

Data received by the friendship token 200 may be stored in the EPROMs/memories of the respective NFC controllers 250/260 or to the internal memory of the microprocessor 250 using respective IIC buses.

Data transmitted from the friendship token 200 may be from the respective EPROMs/memories of the respective NFC controllers 250/260 or from the internal (built-in) memory of the microprocessor 250 using respective IIC buses.

The incoming data may be the first, second, or third type of information as defined by another friendship token communicating with the friendship token 200. The memories 253 and 263 may also contain text files and other types of files and information.

The microprocessor 290 can be implemented by using, for example, a M8L152 series microcontroller chip, manufactured by STMicroelectronics, Geneva, Switzerland. In this example, the friendship token 200 is a passive device (a tag) and is not powered. When one of the two NFC antennas 210 and 220 is stimulated, the corresponding energy harvesting block 257/267 collects power via the antenna 210/220 from the radio frequency field generated by another friendship token in contact or in the proximity of the friendship token 200. The harvesting block then provides power to operate the microprocessor 290 and the corresponding NFC controller. The corresponding communication technology (driver/receiver) may also send a busy signal to the microprocessor 290. For example, if the stimulated antenna is the NFC antenna 210, the energy harvester 257 provides the operating power to microprocessor 290 and the communication technology 251 provides the busy (busy1) signal to the microprocessor 290, and if the stimulated antenna is the NFC antenna 220, the energy harvester 267 provides the operating power to microprocessor 290 and the communication technology 261 provides the busy (busy2) signal to the microprocessor 290. The busy1 or busy2 signals can be used to drive different interrupt inputs of the microprocessor 290. As such, the microprocessor 290 can detect which antenna is stimulated by detecting which NFC controller provides the operating power or the busy signal. If the friendship token 200 is battery powered, the microprocessor 290 may also determine which antenna is stimulated by determining which one of the NFC controllers 250 and 260 is communicating with the microprocessor 290. When an NFC antenna is stimulated, the corresponding NFC controller also receives operating power generated from the RF field. The operating power of the corresponding NFC controller may be from the corresponding energy harvesting block or another component inside the corresponding NFC controller.

Our experiments show that one of the two NFC antennas is usually stimulated earlier. This is because the effective range of NFC is extremely short (less than four inches) and usually only one of the two NFC antennas is in range to be sufficiently stimulated. The effective range is measured from the center of the two NFC antennas of the two NFC devices involved in a communication. Even if both NFC antennas in the friendship token 200 are stimulated at the same time, which is highly unlikely, the microprocessor 290 should preferably select the NFC controller 260 as the earlier one because transmitting the second type of information presents less risk. The microprocessor 290 can also select the NFC controller 250 as the earlier one if privacy is not a major consideration. The preference can be predefined by the owner.

The exemplary NFC controller provides an energy harvesting mode on the analog output pin Vout. When the energy harvesting mode is activated, the exemplary NFC controller can output the excess energy coming from the radio frequency (RF) field on the Vout analog pin to provide operating power to the microprocessor 290. In case the RF field strength is insufficient or when energy harvesting mode is disabled, the analog output pin Vout goes into high-Z state and energy harvesting mode is automatically stopped. In this embodiment, the energy harvesting mode is enabled. The harvested energy is typical 5 mW, depending on the level of the stimulation of the antenna.

The microprocessor 290 is operative or configured to perform various signal processing and control functions (e.g., execute software code, etc.) of the friendship token 200 that facilitates and enables performance of the various embodiments and techniques of the present invention described herein. The microprocessor 290 is operative to perform and/or enable various other functions including, but not limited to, processing user inputs (e.g., enabling/disabling the security element 295, receiving user preferences), controlling functions (e.g., the type of information to be communicated to another NFC device, etc.) of the friendship token 200 in response to user inputs, reading and writing data from and to a memory, communicating and controlling the two NFC controllers 250 and 260, and/or other operations as may be described herein. Also according to exemplary embodiments, the controller 290 may include means, such as an accelerometer, gyroscopic sensor and/or other element(s) for detecting the motion and physical orientation of the friendship token 290. If the friendship token is part of a portable user device, the motion and physical orientation information may be obtained from another controller inside the portable user device.

The microprocessor 290 may interface with an external random access memory or RAM (not shown) or have built-in (internal) RAM (not shown). Preferably, the microprocessor 290 should consume less than 1 mA at 1.8 V at 1 MHz.

The security element 295, when enabled, is operative or configured to provide security functions, such as providing a firewall mechanism to ensure a total separation between applications. In one embodiment, the security is used to determine whether the communication should be terminated or whether the first and second types of information should be transmitted.

In one embodiment, when the security 295 is not enabled, only the third type of information, such as a name of the owner of the friendship token 200, and no first type or second type of information can be transmitted to the requesting friendship token.

In another embodiment, the friendship token 200 may be provided with a user interface to enable/disable the security element 295. For example, the friendship token 200 may include a sensor (not shown) providing a user input to the microprocessor 290 via the IIC bus.

When the sensor detects certain condition, the sensor sends a signal to the microprocessor 290 via the IIC bus and, in response to the signal, the microprocessor 290 enables or disables the security element 295. The sensor may be just detecting open/close condition of a switch. For example, when the switch is in close position, the microprocessor 290 enables the security element 295 and when the switch is in open condition, the microprocessor 290 disables the security element 295. The switch may be a simple mechanical switch activated by the user's fingers. The sensor may include a temperature sensor. When the temperature sensor detects a temperature above certain threshold indicating a warm finger, it activates the switch. The sensor may be a position sensor, such that when the friendship token 200 is in certain position (e.g., landscape), the microprocessor 290 enables the security element 295 and when the friendship token 200 is in a different position (e.g., portrait), the microprocessor 290 disables the security element 295.

The sensor may be a pressure sensor. When the pressure at certain position is sensed to be above a threshold, the microprocessor 290 toggles the state of the security element 295. For example, if the security element 295 is enabled, it is disabled and if the security element is disabled, it is enabled.

The sensor may be a fingerprint sensor. When the owner's finger print is detected, the microprocessor 290 toggles the state of the security element 295.

A mechanical switch, or a pressure sensor, or a temperature sensor, all activated by a user's finger is preferred because it is more effective to prevent unwanted switch of the state of the security element 295, thereby preventing unwanted data transfer.

Each NFC chip has a unique identification number, which may be 64 bit wide. In addition to the security element 295, the identification number of the requesting friendship token may be used to decide whether information should be sent or which type of information should be sent. For example, the friendship token 200 may include a white list (approved list) and a black list (disapproved list) including identifications of NFC devices in the internal memory of the microprocessor 290. If the identification of the requesting NFC device is in the white list, sending information is allowed and if the identification number is in the black list, sending information is disallowed or sending just the third type of information. Another security measure can be taken in addition to the security element 295 is checking a password provided by the requesting NFC device. More advanced algorithm can also be used.

In one embodiment, the functions of the NFC controllers 250 and 260 may be incorporated into the microprocessor 290.

It is well known that NFC communication exists in three modes.

1. The reader mode: An active device (including power, battery) communicates with a passive device (powered during the contact by energy harvesting from the NFC transmission). An example of a passive device is a mobile-phone with Radio-frequency identification (RFID) and an RFID-Tag.

2. Card emulation mode: Two active devices including NFC. The one who gets the request emulates a passive device RFID-Tag.

3 The peer to peer mode: Two active devices including NFC exchanging data via NFC.

Although illustrated as a passive device, the friendship token 200 is not limited to NFC mode one. With a small battery included in the friendship token 200, the friendship token 200 can work in mode two or three and may switch to Bluetooth LE (Low Energy) for the data transfer (this handover process is well known). A switch may be added to switch the battery on or off. The battery life is not critical because of the extreme low power consumption. If the batteries are of the rechargeable type, they can recharge using the harvested energy. In this case, a switch may not be needed. Furthermore, the NFC antenna may be used to start the charging process while the friendship token 200 is put in a charging station for stimulation. For example, to start the charging process, a user may re-orient the antennas in certain way, for example, flipping the friendship token 200, switching the friendship token 200 between a landscape orientation and a portrait orientation.

Figure 3:
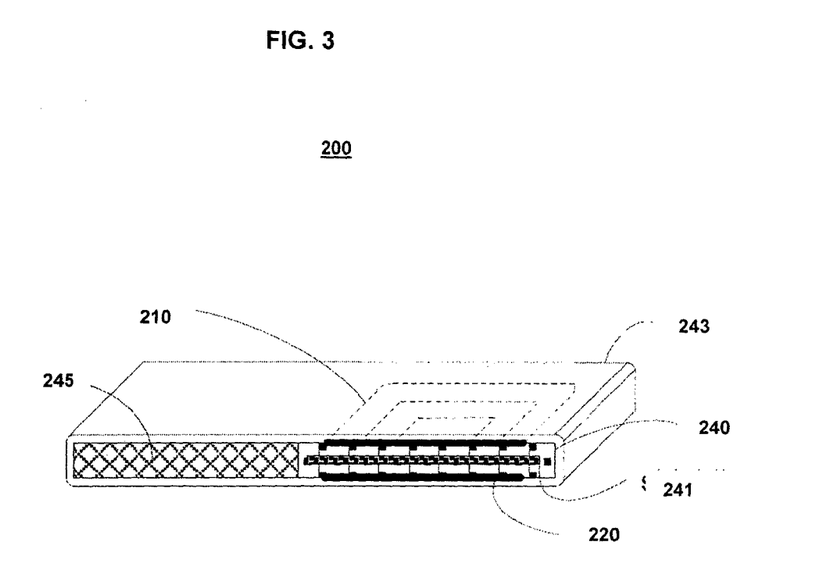
FIG. 3 shows a cross-section view of the exemplary friendship token 200 according to an exemplary embodiment of the present invention.

FIG. 3 illustrates a cross-section view of the exemplary friendship token 200. The exemplary friendship token 200 has a shape of a credit card, which is usually a rectangular thin card. The electronics 245 includes everything in FIG. 2 except the two antennas. Illustratively, the electronics 245 of the friendship token 200 is located on one side of the card and the two NFC antennas 210 and 211 are located on the other side of the card, enclosed in an isolating and protecting hull 243. If a battery and or a sensor are included, the battery and/or the sensor should be placed at the same side as the electronics 245. The antenna 210 is placed on the top face (the first face) of the friendship token 200 and the antenna 220 is placed on the bottom face (the second face) of the friendship token 200. Each NFC antenna illustratively has four windings on a printed circuit board (PCB) having a diameter of about one inch. The effective range of the NFC antenna is measured from the center of the printed windings. An electrical isolating material 240, such as plastic, is inserted between the two antennas to electrically isolating the two antennas. To prevent both NFC antennas to be stimulated at the same time, electromagnetic shield 241 made of, for example, metal, is placed in the middle of the isolating material 240.

Figure 4:
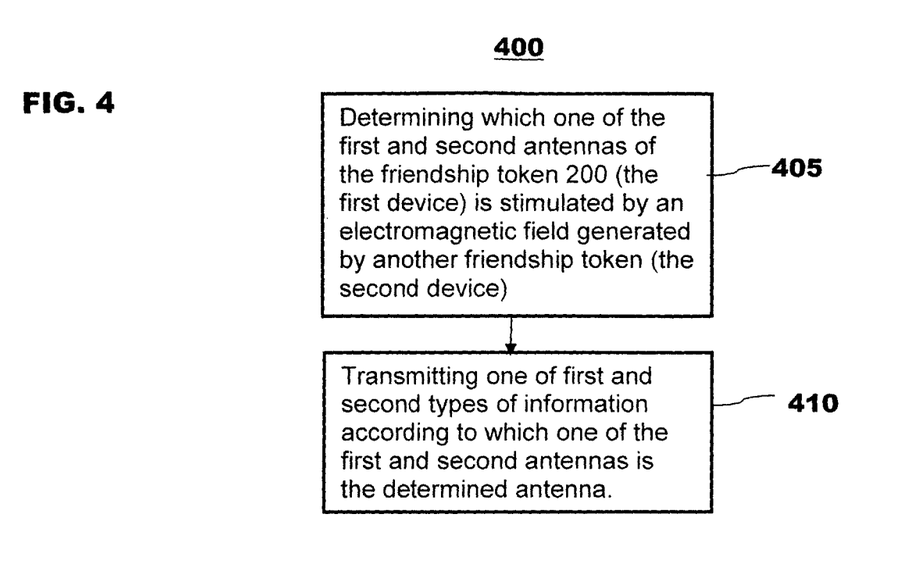
FIG. 4 shows an exemplary process 400 performed at the friendship token 200 for transferring first or second type of information according to which of the first and antennas is stimulated by another NFC device according to an exemplary embodiment of the present invention.

Referring to FIG. 4 an exemplary process 400 performed at the friendship token 200 for transferring first or second type of information according to which one of the first and antennas is stimulated by another NFC device is shown. In this example, we assume that the friendship token 200 (the first device) is passive and another NFC device (the second device) is a second friendship token that is battery powered. When the second friendship token is within the effective range of one of the two antennas 210 and 220 of the friendship token 200, the antenna within the range is stimulated by the RF field generated by the second friendship token and the corresponding energy harvesting element provides the operating power as discussed above with respect to FIG. 2. For example, if the center of the antenna 210 is within the range of the second friendship token, the NFC antenna 210 is stimulated and the energy harvesting block 257 provides the operating power to the microprocessor 290. On the other hand, if the center of the antenna 220 is within the range of the second friendship token, the NFC antenna 220 is stimulated and the energy harvesting block 267 provides the operating power to the microprocessor 290.

At step 405, the microprocessor 290 of the friendship token 200 determines which one of the first and second antennas of the friendship token 200 is stimulated by an electromagnetic field, which should be a RF field, generated by the second friendship token, as discussed above with respect to FIG. 2. The RF field generated by the second friendship token in this embodiment is a non-radiative electromagnetic field or a near field. The determination can be done by the NFC controllers 250 and 260 as well because when a NFC controller is communicating with the second friendship token, the NFC controller can determine that the associated antenna has been stimulated. In either case, the microprocessor is informed of which one of the NFC controllers 250 and 260 is active. Once determining the active NFC controller, the microprocessor 290 is operative or configured to determine that the NFC antenna is stimulated. In one embodiment, when the microprocessor 290 determines that one NFC controller is active, the microprocessor 290 disables the other NFC controller. As discussed previous, the functions of the two NFC controllers can be incorporated into the microprocessor 290. As such, microprocessor 29Q may include more than one processor.

At step 410, the microprocessor 290 transmits one of first and second types of information according to which one of the first and second antennas is stimulated (the determined antenna). For example, if the first antenna is the determined antenna, the first type of information is transmitted and if the second antenna is the determined antenna, the second type of information is transmitted. The transmission is accomplished via the corresponding communication technology and the corresponding antenna. The first type of information can be stored in the memory 253 of the NFC controller 250 and/or the internal memory of the microprocessor 290 and the second type of information can be stored in the memory 263 of the NFC controller 260 and/or the internal memory of the microprocessor 290. Other types of information may be stored in the memory 253, 263, and/or the internal memory of the microprocessor 290.

In one embodiment, if no security is checked before transmitting the first or second type of information, the microprocessor 290 needs not be involved and the NFC controller associated with the stimulated antenna may transmit the type of information stored in the memory when the NFC controller becomes active. For example, if the NFC antenna 210 is determined stimulated, the NFC controller 250 retrieves the first type of information from its memory 253 and transmits the first type of information to the second friendship token, and if the NFC antenna 220 is determined stimulated, the NFC controller 260 retrieves the second type of information from its memory 263 and transmits the second type of information to the second friendship token.

Other security measures may be incorporated as well. For example, the process 400 may include steps of determining if a security element 295 is enabled before transmitting the first or second type of information, and if the security element 295 is not enabled, transmitting a third type of information without transmitting the first or second type of information.

For another example, the process 400 may include steps of receiving a signal from the second friendship token, the signal including an identification of the second friendship token; determining if the identification of the second friendship token exists in a database before transmitting the first or second type of information; and if the identification does not exist in the database, terminating communication with the second friendship token or transmitting a third type of information without transmitting the first or second type of information.

In addition to the first or second type of information, the friendship token 200 may transmit more information from a database if certain condition is satisfied. For example, if the friendship token receives a pair of name and password from the second friendship token and if the pair exists in database, the microprocessor 290 is configured or operative to transmit data stored in the data base relating to the received user name; and if the pair does not exist in the database, the microprocessor 290 is configured or operative to transmit a third type of information. Examples of data related to the received name are pictures related to the received names, such as pictures having the person associated with the received name in them, business data that the associated person is involved, or a key that the associated person needs.

With the present embodiment, the types of information exchanged between the friendship token 200 and the second friendship token are shown in the following table, assuming that no security measure is taken and the first and second antennas are located at face 1 (the first face) and face 2 (the second face) of a friendship token, respectively:

| Face of Friendship Token 200 and Face of the second Friendship Token | The Type of Information Transmitted by the Friendship Token 200 | The Type of Information Transmitted by the Second Friendship Token |
|---|---|---|
| Face 1, Face 1 | The first type | The first type |
| Face 1, Face 2 | The first type | The second type |
| Face 2, Face 1 | The second type | The first type |
| Face 2, Face 2 | The second type | The second type |

If the second friendship token has only one NFC antenna, the friendship token 200 sends one of the first and second types of information according which face is used and the second friendship token always transmits only one type of information as defined by the second friendship token. The principle can be extended to a friendship token having more than two faces each placed an antenna and the type of information transmitted depends on which one of the more than two antennas is stimulated.

Figure 5:
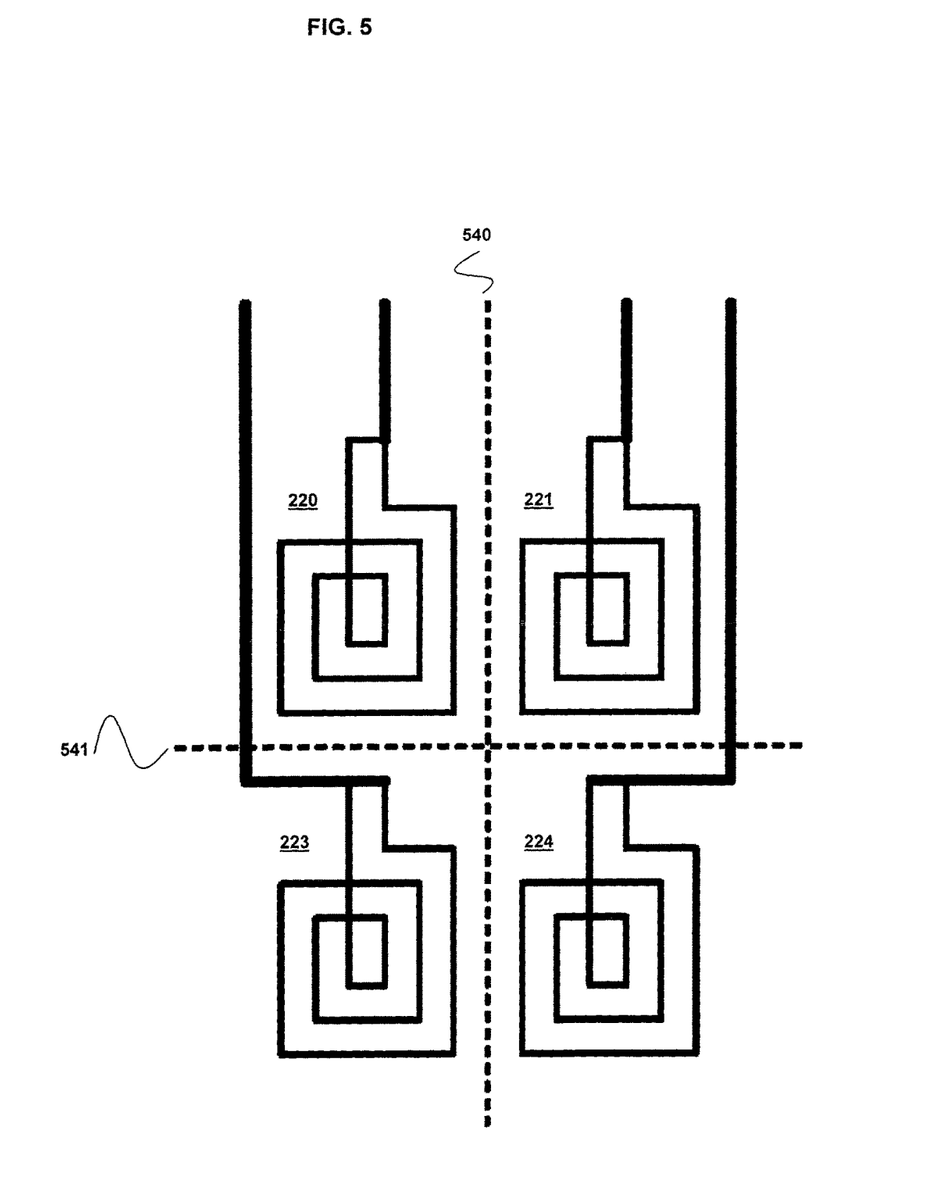
FIG. 5 shows that four antennas associated with four different NFC controllers can be placed in one face of the friendship token 200 according to another exemplary embodiment of the present invention.
Figure 6:
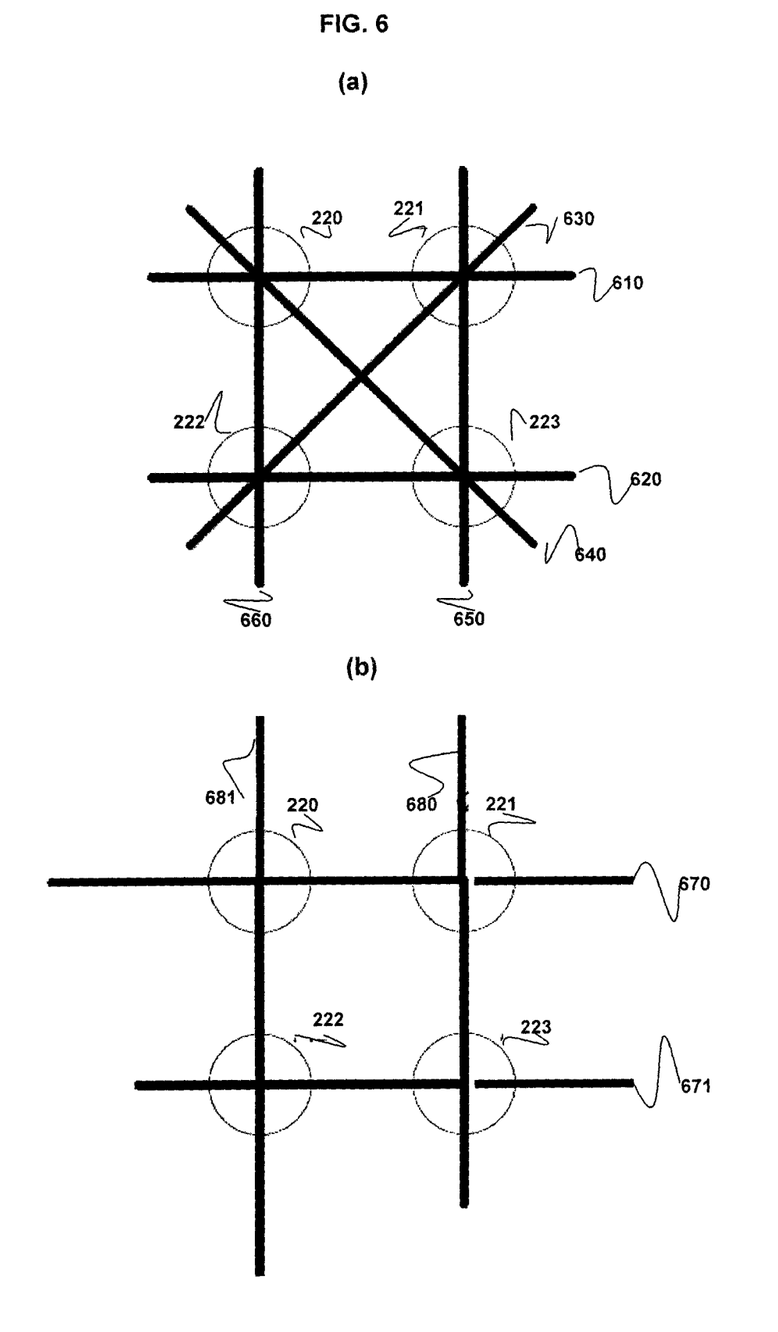
FIG. 6 shows different movements involving two or more antennas according to still another exemplary embodiment of the present invention.

As discussed above, the friendship token 200 may include more than two NFC controllers each associated with a different antenna. For example, the NFC controller 260 may be replaced by four NFC controllers respectively associated with antennas 220, 221, 222, 223, and 224 as shown in FIG. 5. This four antennas are orthogonally placed in the second face of the friendship token 200 as a two dimensional array. Electromagnetic shields 540 and 541 provide isolation among these four antennas. With this arrangement, a movement involving two or more antennas can be detected (see FIGS. 6(a) and 6(b)). In FIG. 6(a), it is illustrated a plurality of paths can be detected using only two antennas. For example, if the user slides the friendship token 200 horizontally with respect to the second friendship token, microprocessor 290 should detect a horizontal movement following path 610 or 620. If the path 610 is followed and the antenna 220 is first detected to be stimulated then the antenna 221, the user should slide the friendship token 200 from left to right with respect to the second friendship token. If the antenna 221 is detected first then the antenna 220, the sliding is from right to left. The situation is similar if the path 620 is followed.

For sliding vertically with respect to the second friendship token, path 650 or 660 is followed. Sliding downward causes either antenna 222 or 223 to be detected first then antenna 220 or 221 and sliding upward causes either antenna 220 or 221 to be detected first then antenna 222 or 223.

For sliding diagonally with respect to the second friendship token, path 630 or 640 is followed. Sliding downward causes either antenna 222 or 223 to be detected first then antenna 221 or 220 and sliding upward causes either antenna 220 or 221 to be detected first then antenna 223 or 222.

FIG. 6(b) illustrates that L-shape movements can also be detected using three antennas. If paths 670 and 680 are followed, the movement can be horizontal then vertical, or vertical then horizontal. In the horizontal then vertical movement, the user slides the friendship token 200 from left to right with respect to the second friendship token, then slides the friendship token 200 upward. In the vertical then horizontal movement, the user slides the friendship token 200 downward first then from right to the left. The combination of paths 670 and 681, the combination of paths 671 and 681, the combination of paths 671 and 680 are similar. Although not illustrated, a 7-shape movement can also detected using three antennas, which involves a vertical or horizontal movement and a diagonal movement (the path not shown).

U-shape movements can be detected also using four antennas. For example, a U-shape movement may follow the paths 670, 680, and 671. For another example, U-shape movement may follow the paths 680, 670, and 681. They are six other combinations of paths to form U-shape movements, as can be seen from FIG. 6(b). A Z-shape movement can also detected using four antennas. For example, a Z-shape movement may follow the path 670, a diagonal movement (the path not shown), and then the path 671. For another example, a Z-shape movement may follow the path 680, a diagonal movement (the path not shown), and then the path 681. There are six other combinations of paths to form Z-shape movements.

Since the detection time of a NFC-controller is between 1 and 5 ms and the diameter of a coil is about 2 cm, a movement of 2 cm/5 ms=4 m/s is detectable.

In yet another embodiment, double stimulation of an antenna is also possible like: the antenna 220 then the antenna 221 then back to antenna 220.

In another embodiment, a specific path involving two or more antennas with or without direction information can be used as a security measure. For example, detecting the specific path with or without storing direction information, which may be one of the paths and directions described above with respect to FIGS. 6(a) and 6(b), causes the microprocessor 29 to allow data or information to be transmitted in addition to the first or second type of information, or to allow transfer of the first or second type of information. Without detecting the specific path with or without direction information, the microprocessor 290 may transmit the third type of information or simply terminating the communication. In this embodiment, the user should place one face of the friendship token 200 close to the second friendship token causing one of the two NFC antennas 210 and 220 to be stimulated. The user, after a predefined period, for example two seconds, slides the friendship token 200 with respect to the second friendship token following the specific path with or without specific direction of movement. The waiting of the predefined period informs the second friendship token that the security path is coming. The specific path with or without direction information can be created by a user of a friendship token and stored in the internal memory of the microprocessor 290 or memories of the two NFC controllers 250 and 260. More than one path with or without direction information can be stored and each may permits different types of additional information to be transmitted.

For another example, if one of the antennas 210 and 220 is stimulated and no other antenna is stimulated within a predefined period such as three seconds, and then the antennas 220 and 221 are stimulated in sequence (following path 510) within a predefined interval such as two seconds, the microprocessor 290 may allow transmission of only a fourth type of information as defined by the user, which is different from the first, second, and third types of information, or in addition to the first and second types of information. This example can be applied to any path described above with or without direction information.

In another embodiment, each way of sliding, as discussed above, may initiate transfer of a different type of information including the first, second, third or another type, as defined by the user.

In a further embodiment, the friendship-token 200 may include more than two contacting faces (e.g., like a cube having six surfaces) and each face is placed a different NFC antenna associated with a different NFC controller. For example, in addition to the first and second faces, the friendship token 200 has a third face placed a third NFC antenna associated with a third NFC controller. When the third NFC antenna is stimulated, the friendship token 200 may transmit a fourth type of information, different from the first, second, and third types of information, as defined by the user.

In another embodiment, different sets of friends (e.g., represented by different NFC identifications) are allowed in different antennas. For example, first, second, and third sets of friends are respectively allowed for the first, second, and third antennas.

Although NFC antennas are illustrated, other types of antennas can be used as well. For example, they can be antennas stimulated by radiative electromagnetic fields or far fields.

As described above, the present invention provides automatically transfer information for a hand-held electronic device, such as an electronic business card, a mobile telephone device, a touch tablet, a portable personal computer (PC), a remote control device, and/or other devices that advantageously transfer different type of information or allow different set of NFC identifications to communicate with the hand-held electronic device depending on which one of at least two antennas is stimulated in the hand-held electronic device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for a first device comprising:
   transmitting a first type of information if a first antenna of the first device is stimulated by an electromagnetic field; and
   transmitting a second type of information if a second antenna of the first device is stimulated by the electromagnetic field; and transmitting a fourth type of information if a third antenna of the first device is stimulated by the electromagnetic field.

2. The method of claim 1, wherein the electromagnetic field is a non-radiative field.

3. The method of claim 1, further comprising:
   determining if a security element is enabled before transmitting the first or second type of information; and
   if the security element is not activated, transmitting a third type of information without transmitting the first or second type of information.

4. The method of claim 1, further comprising
   receiving a name and a password from a second device;
   if the name and password exist in a database, transferring data stored in the data base relating to the received user name; and
   if the name and password do not exist in the database, transmitting a third type of information.

5. The method of claim 4, wherein the first type of information includes business card and private card information, the second type of information includes business card but no private card information, and third type information is a name stored in the first device.

6. The method of claim 4, wherein the first, second, and third types of information are predefined by a user and stored in a memory of the first device.

7. The method of claim 1, wherein the first device has first and second faces and the first and second antennas are placed respectively at the first and second faces with a first electromagnetic shield placed between the first and second antennas.

8. The method of claim 7, wherein the first device further includes a third antenna placed in the second face along with the second antenna and a second electromagnetic shield is placed between the second and third antennas.

9. A first electronic device comprising: a first antenna; a second antenna; and a microprocessor;
   wherein the microprocessor is configured to transmit a first type of information if the first antenna is stimulated by an electromagnetic field and transmit a second type of information if the second antenna is stimulated by the electromagnetic field and further comprising a third antenna and the microprocessor being configured to transmit a fourth type of information if the third antenna is stimulated by the electromagnetic field.

10. The first electronic device of claim 9, wherein the electromagnetic field is a non-radiative field.

11. The first electronic device of claim 9, wherein the microprocessor is configured to receive a signal from a second electronic device, the signal including an identification of the second electronic device; determine if the identification of the second electronic device exists in a database before transmitting the first or second type of information; and if the identification does not exist in the database, terminate communication with the second electronic device or transmit a third type of information without transmitting the first or second type of information.

12. The first electronic device of claim 9, wherein the first type of information includes business card and private card information, the second type of information includes business card but no private card information, and third type information is a name stored in the first device.

13. The first electronic device of claim 9, wherein the first, second, and third types of information are predefined by a user and stored in a memory of the first device.

14. The first electronic device of claim 9, further comprising first and second faces and the first and second antennas are placed respectively at the first and second faces with a first electromagnetic shield placed between the first and second antennas.

15. The first electronic device of claim 14, further comprising a third antenna placed in the second face along with the second antenna and a second electromagnetic shield is placed between the second and third antennas.

* * * * *